US011243660B2

(12) United States Patent
Lu et al.

(10) Patent No.: US 11,243,660 B2
(45) Date of Patent: Feb. 8, 2022

(54) METHOD AND DEVICE FOR DISPLAYING APPLICATION, AND STORAGE MEDIUM

(71) Applicant: Beijing Xiaomi Mobile Software Co., Ltd., Beijing (CN)

(72) Inventors: Zhenzhou Lu, Beijing (CN); Shao Chen, Beijing (CN); Jiayan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 201 days.

(21) Appl. No.: 16/047,790

(22) Filed: Jul. 27, 2018

(65) Prior Publication Data

US 2019/0034046 A1 Jan. 31, 2019

(30) Foreign Application Priority Data

Jul. 28, 2017 (CN) .......................... 201710631473.5

(51) Int. Cl.
*G06F 3/0482* (2013.01)
*G06F 3/0488* (2022.01)

(52) U.S. Cl.
CPC .......... *G06F 3/0482* (2013.01); *G06F 3/0488* (2013.01); *G06F 3/04883* (2013.01)

(58) Field of Classification Search
CPC ... G06F 3/04883; G06F 3/0482; G06F 3/0488
See application file for complete search history.

(56) References Cited

U.S. PATENT DOCUMENTS

| | | | |
|---|---|---|---|
| 2008/0244454 A1 | 10/2008 | Shibaike | |
| 2010/0299638 A1* | 11/2010 | Choi | ...................... G06F 3/0488 715/835 |
| 2012/0174042 A1 | 7/2012 | Chang | |

(Continued)

FOREIGN PATENT DOCUMENTS

| | | |
|---|---|---|
| EP | 2 472 377 A2 | 7/2012 |
| EP | 3 128 726 A1 | 2/2017 |

(Continued)

OTHER PUBLICATIONS

Extended Search Report dated Nov. 8, 2018 in European Patent Application No. 18186100.6, citing documents AO, Ap, AQ and AR therein, 8 pages.

(Continued)

*Primary Examiner* — Beau D Spratt
(74) *Attorney, Agent, or Firm* — Oblon, McClelland, Maier & Neustadt, L.L.P.

(57) ABSTRACT

The present disclosure relates to a method and a device for displaying an application, and a storage medium. The method includes detecting a start of a target sliding operation by a user on a terminal; in response to detecting the start of the target sliding operation, displaying an application list on a current display interface of the terminal, the application list including an application identification of at least one application installed on the terminal; acquiring an end position of the target sliding operation on the application list; determining an application indicted by a first application identification displayed at the end position as a target application selected by the user; and displaying an application interface of the target application on the current display interface.

18 Claims, 13 Drawing Sheets

(56) References Cited

U.S. PATENT DOCUMENTS

| | | | |
|---|---|---|---|
| 2012/0235930 A1 | 9/2012 | Lazaridis et al. | |
| 2013/0082965 A1* | 4/2013 | Wada | G06F 3/04883 345/173 |
| 2013/0117718 A1 | 5/2013 | Lazaridis et al. | |
| 2013/0022741 A1 | 8/2013 | Lee et al. | |
| 2013/0263042 A1* | 10/2013 | Buening | G06F 3/0488 715/783 |
| 2013/0321444 A1* | 12/2013 | Efrati | G06F 3/0483 345/589 |
| 2014/0068518 A1 | 3/2014 | Liu et al. | |
| 2014/0089833 A1 | 3/2014 | Hwang et al. | |
| 2014/0298268 A1* | 10/2014 | Kang | G06F 3/04847 715/841 |
| 2014/0344765 A1* | 11/2014 | Hicks | G06F 3/04883 715/863 |
| 2015/0268811 A1* | 9/2015 | Min | G06F 3/0483 715/765 |
| 2015/0365306 A1* | 12/2015 | Chaudhri | G06F 3/0484 715/736 |
| 2016/0070401 A1* | 3/2016 | Kim | G06F 3/0482 345/174 |
| 2016/0246484 A1 | 8/2016 | Kim et al. | |
| 2016/0357368 A1* | 12/2016 | Federighi | G06F 3/04842 |
| 2017/0038964 A1 | 2/2017 | Jang et al. | |
| 2017/0075563 A1* | 3/2017 | Bauer | G06F 3/0485 |
| 2017/0192667 A1 | 7/2017 | Lazaridis et al. | |

FOREIGN PATENT DOCUMENTS

| | | |
|---|---|---|
| WO | WO 2012/097385 A2 | 7/2012 |
| WO | WO 2015/068872 A1 | 5/2015 |

OTHER PUBLICATIONS

Second Office Action issued in European Patent Application No. 18186100.6 dated Nov. 4, 2021 (5 pages).

* cited by examiner

METHOD AND DEVICE FOR DISPLAYING APPLICATION, AND STORAGE MEDIUM

CROSS-REFERENCE TO RELATED APPLICATIONS

This application is based upon and claims priority to Chinese Patent Application No. 201710631473.5, filed on Jul. 28, 2017, the entire contents of which are incorporated herein by reference.

TECHNICAL FIELD

The present disclosure generally relates to the field of electronic technology, and more particularly, to a method and a device for displaying an application, and a storage medium.

BACKGROUND

With the rapid development of electronic technology, smart terminals may support an increasing number of types of applications. Accordingly, user demands for switching different applications have emerged. For example, when a user is using an E-commerce application on a smart terminal for shopping, the user usually has to click the HOME button (i.e., return button) to enter the desktop of the smart terminal, before the user can click an icon for an application (e.g., social media application), for example, to enter the dialog interface to check messages in the social media application. After the user replies to the messages in the dialog interface of the social media application, again, the user has to click the HOME button to enter the desktop of the smart terminal before the user can click the E-commerce application to enter the interface of the E-commerce application to continue the shopping. Thus, operation for switching different application interfaces is cumbersome.

In the related art, in order to simplify the operation of switching application interface of different applications on the display interface of a smart terminal, a trigger region may be setup at an edge of the screen of the smart terminal. When the smart terminal receives a trigger operation on the trigger region from the user, an application list may be displayed in the current display interface. When the smart terminal receives a click operation on a target application in the application list from the user, the smart terminal may display the application interface of the target application in the current display interface.

However, when the smart terminal receives a trigger operation on the trigger region from the user, only an application list is displayed in the current display interface, and the terminal has to receive a click operation on a target application from the user before the terminal switches to the application interface of the target application. The operation for switching application interfaces of different applications is still cumbersome.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for displaying an application. The method includes detecting a start of a target sliding operation by a user on a terminal; in response to detecting the start of the target sliding operation, displaying an application list on a current display interface of the terminal, the application list including an application identification of at least one application installed on the terminal; acquiring an end position of the target sliding operation on the application list; determining an application indicted by a first application identification displayed at the end position as a target application selected by the user; and displaying an application interface of the target application on the current display interface.

According to an aspect, the method further includes, when detecting the start of the target sliding operation on a terminal, detecting whether the current display interface of the terminal is an application interface; and when the current display interface of the terminal is an application interface, displaying the application list on the application interface.

According to another aspect, the method further includes, after determining the target application selected by the user, when receiving a selection operation continuously performed with the target sliding operation at the end position, displaying a list of function options of the target application on the current display interface; receiving a touch operation performed by the user on a function option in the list of function options; and displaying a function interface corresponding to the function option of the target application on the current display interface.

In an example, displaying the application list on the current display interface of the terminal includes: during the target sliding operation, displaying the application list on the current display interface of the terminal such that a size of the first application identification in the application list changes with change of a sliding position of the target sliding operation on the application list.

According to an aspect, the method further includes, when the sliding position of the target sliding operation on the application list overlaps with a position for displaying the first application identification, distinguishingly displaying the first application identification.

In an example, distinguishingly displaying the application identification includes reducing sizes of other application identifications except the first application identification such that the first application identification has a size that is larger than the other application identifications in the application list.

In another example, distinguishingly displaying the application identification includes increasing the size of the first application identification such that the first application identification has a size that is larger than the other application identifications in the application list.

In yet another example, distinguishingly displaying the application identification includes highlighting the first application identification.

According to an aspect, when displaying the application list, the method includes, during the target sliding operation, displaying the application list on the current display interface of the terminal such that a background color of the application list changes with change of a sliding position of the target sliding operation on the application list.

According to another aspect, the method further includes, when a sliding position of the target sliding operation on the application list overlaps with a position for displaying the first application identification, displaying basic information of the application indicated by the first application identification, the basic information including a name of the application indicated by the first application identification.

According to yet another aspect, the method further includes, during the target sliding operation, with change of a sliding position of the target sliding operation on the application list, playing different audio.

Aspects of the disclosure also provide a device for displaying an application. The device includes a processor and a memory for storing instructions executable by the processor. The processor is configured to detect a start of a target sliding operation by a user on a terminal; in response to detecting the start of the target sliding operation, display an application list on a current display interface of the terminal, the application list including an application identification of at least one application installed on the terminal; acquire an end position of the target sliding operation on the application list; determine an application indicted by a first application identification displayed at the end position as a target application selected by the user; and display an application interface of the target application on the current display interface.

Aspects of the disclosure also provide a non-transitory computer-readable medium storing instructions that, when executed by one or more processors of a computing device, cause the computing device to detect a start of a target sliding operation by a user on a terminal; in response to detecting the start of the target sliding operation, display an application list on a current display interface of the terminal, the application list including an application identification of at least one application installed on the terminal; acquire an end position of the target sliding operation on the application list; determine an application indicted by a first application identification displayed at the end position as a target application selected by the user; and display an application interface of the target application on the current display interface.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
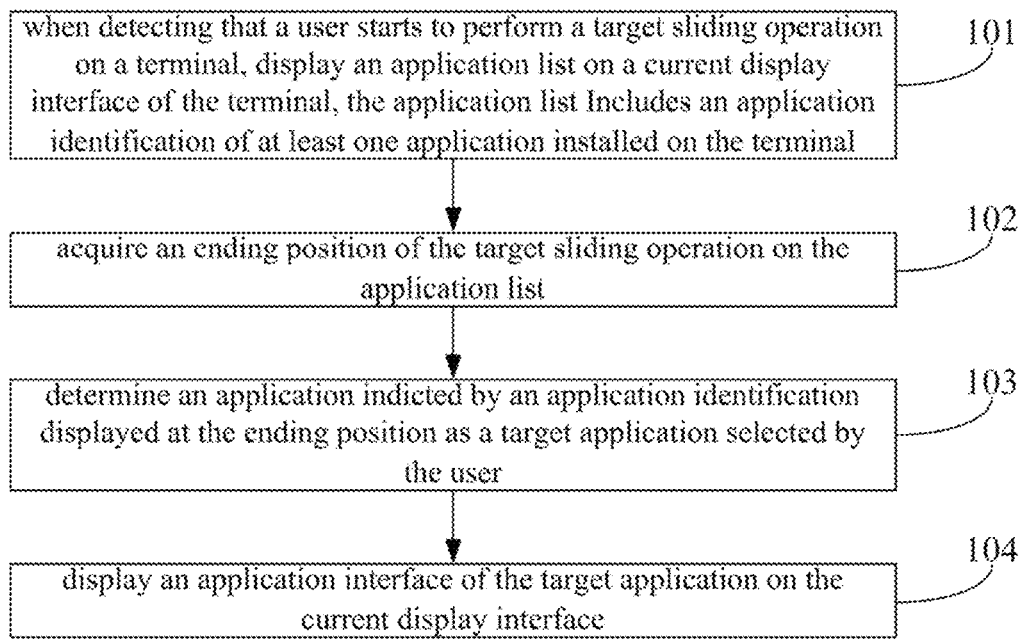
FIG. 1 is a flow chart illustrating a method for displaying an application according to an exemplary aspect of the present disclosure.

In order to solve the problem of the cumbersome operation for switching application interfaces of different applications, an aspect of the present disclosure provides a method for displaying an application. As shown in FIG. 1, the method may include the following steps.

In step 101, when it is detected that the user starts to perform a target sliding operation on the terminal, an application list is displayed on the current display interface of the terminal, the application list including an application identification of at least one application installed on the terminal.

In step 102, an ending position of the target sliding operation on the application list is acquired.

In step 103, an application indicted by an application identification displayed at the ending position is determined as a target application selected by the user.

In step 104, an application interface of the target application is displayed on the current display interface.

Accordingly, in the method for displaying an application provided by the aspect of the present disclosure, when the terminal detects a target sliding operation, the terminal may display an application list on the current display interface. After an ending position of the sliding operation is acquired, an application interface of an application indicated by an application identification displayed at the ending position may be displayed on the current display interface. Thus, it may display an application by one step operation. When the current display interface is an application interface of an application, it may achieve the function of switching an application, and simplify the operation for switching application interfaces of different applications.

Figure 2A:
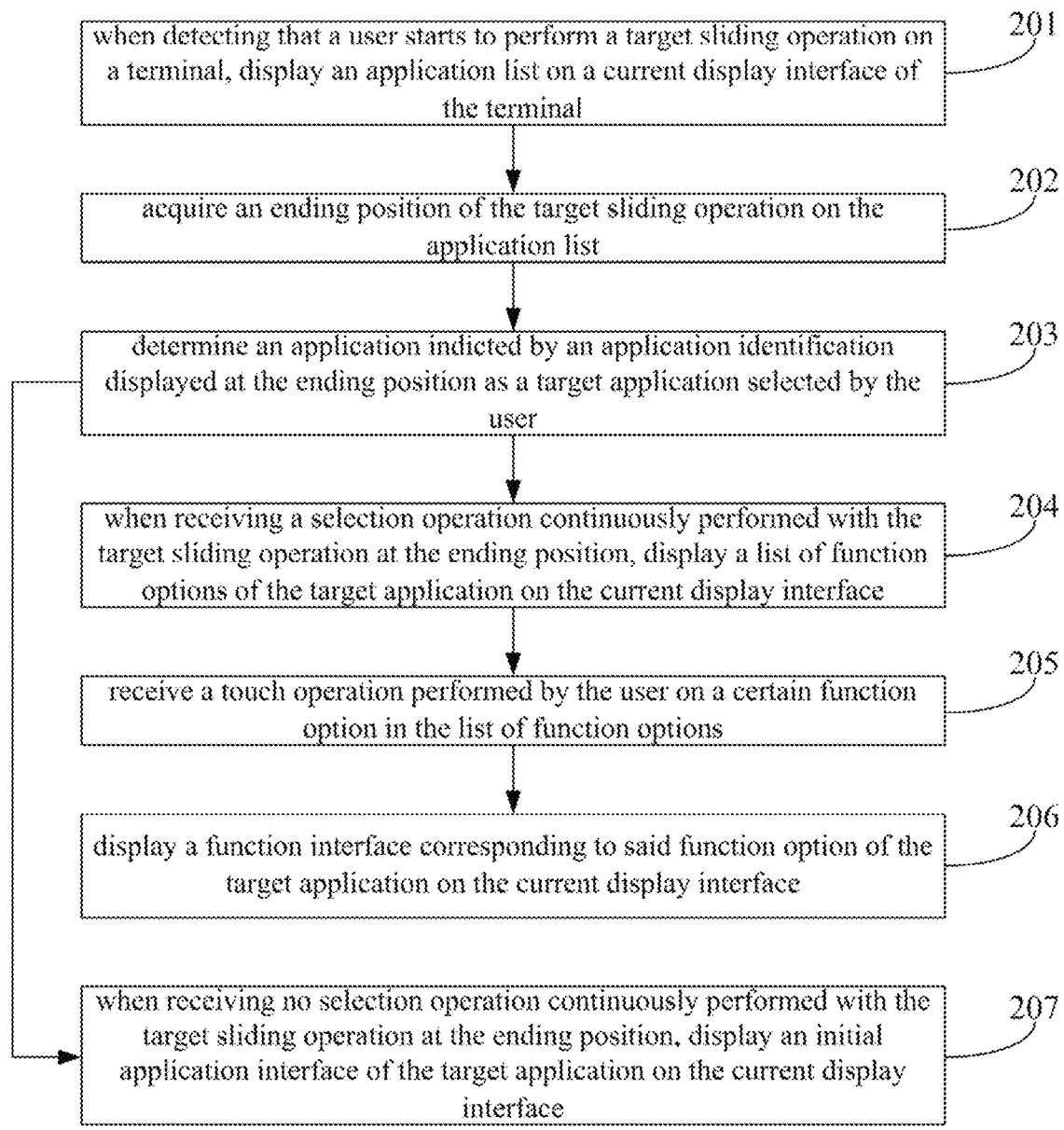
FIG. 2A is a flow chart illustrating another method for displaying an application according to an exemplary aspect of the present disclosure.

FIG. 2A is a flow chart illustrating another method for displaying an application according to an exemplary aspect of the present disclosure. As shown in FIG. 2, the method may include the following steps.

In step 201, when it is detected that the user starts to perform a target sliding operation on the terminal, an application list is displayed on the current display interface of the terminal.

The target sliding operation includes a rightward sliding operation at a left edge of the display interface of the terminal, or a leftward sliding operation at a right edge of the display interface of the terminal.

Figure 2B:
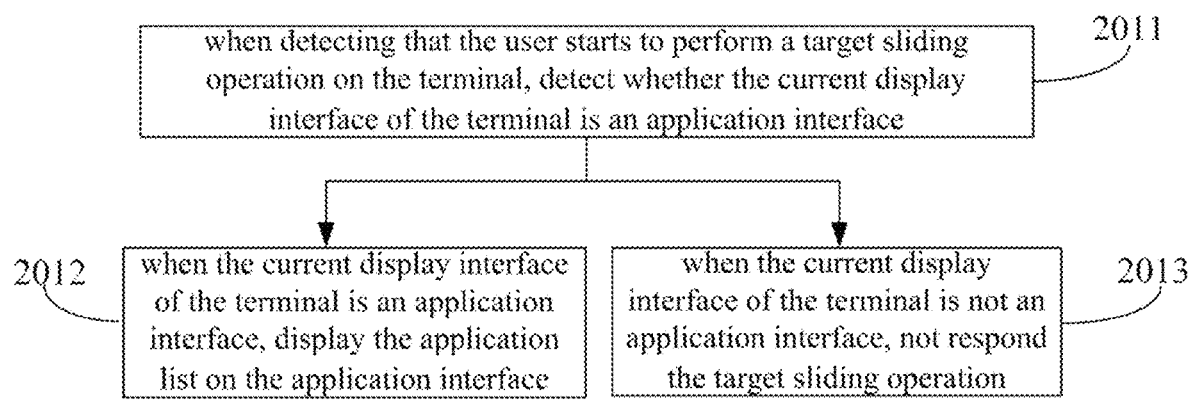
FIG. 2B is a flow chart illustrating a method for displaying an application list according to an exemplary aspect of the present disclosure.

Optionally, as shown in FIG. 2B, when it is detected that the user starts to perform a target sliding operation on the terminal, displaying an application list on the current display interface may include the following steps.

In step 2011, when it is detected that the user starts to perform a target sliding operation on the terminal, it is detected whether the current display interface of the terminal is an application interface.

Optionally, it is detected that the user starts to perform a target sliding operation on the terminal, that is, it is detected that the user starts to perform a rightward sliding operation at a left edge of the display interface of the terminal, or the user starts to perform a leftward sliding operation at a right edge of the display interface of the terminal.

The application interface may be an application interface of any of the applications installed on the terminal.

In step 2012, when the current display interface of the terminal is an application interface, the application list is displayed on the application interface.

Figure 3A:
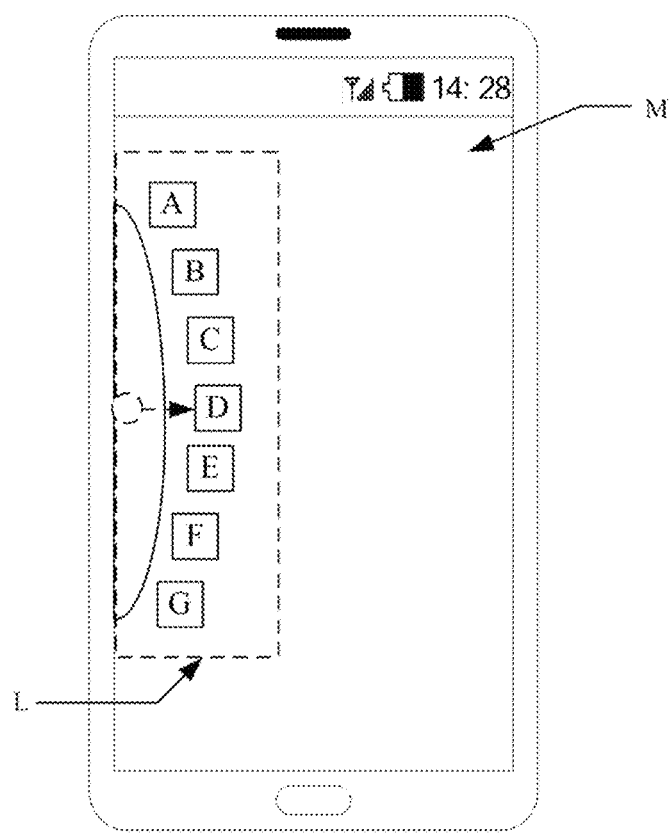
FIG. 3A is a diagram illustrating an interface of an application list according to an exemplary aspect of the present disclosure.

For example, as shown in FIG. 3A, the current display interface of the terminal is an application interface M of any application. When it is detected that the user starts to perform a target sliding operation, for example, when it is detected that the user starts to perform a rightward sliding operation at a left edge of the display interface of the terminal, the application list may be displayed on the application interface. The application list includes an application identification of at least one application installed on the terminal. The application identification may be an identification which may uniquely identify the application, such as an application icon, a thumbnail of an application icon or an application name and the like.

Optionally, as shown in FIG. 3A, an application list L is displayed at an edge of the current display interface of the terminal. It is assumed that the application list L includes an application identification A, an application identification B, an application identification C, an application identification D, an application identification E, an application identification F and an application identification G.

The application identifications in the application list L may be application identifications of all of the applications installed on the terminal, or may be application identifications of applications used by the user in a preset time period, which are detected by the operating system of the terminal, or may be application identifications of applications used by the user for a number times larger than a preset number of times in the history (i.e. frequently used application identifications), which are detected by the operating system of the terminal, or may be application identifications of applications previously set up by the user. The setup of the application identifications in the application list is not limited in the aspect of the present disclosure.

Further, during the process of performing the target sliding operation, the application list is displayed on the current display interface of the terminal such that the size of the application identification in the application list changes with the change of the sliding position of the target sliding operation on the application list.

Optionally, when the sliding position of the target sliding operation on the application list approaches a certain application identification, the size of the application identification may increase with the decrease of the distance from the sliding position to the application identification. When the sliding position of the target sliding operation on the application list overlaps with the position for displaying a certain application identification, the application identification is displayed distinguishingly.

Distinguishingly displaying a certain application identification may include:

reducing sizes of application identifications except said application identification such that said application identification is the application identification having the largest size in the application list; and/or increasing the size of said application identification such that said application identification is the application identification having the largest size in the application list; and/or highlighting said application identification.

Figure 3B:
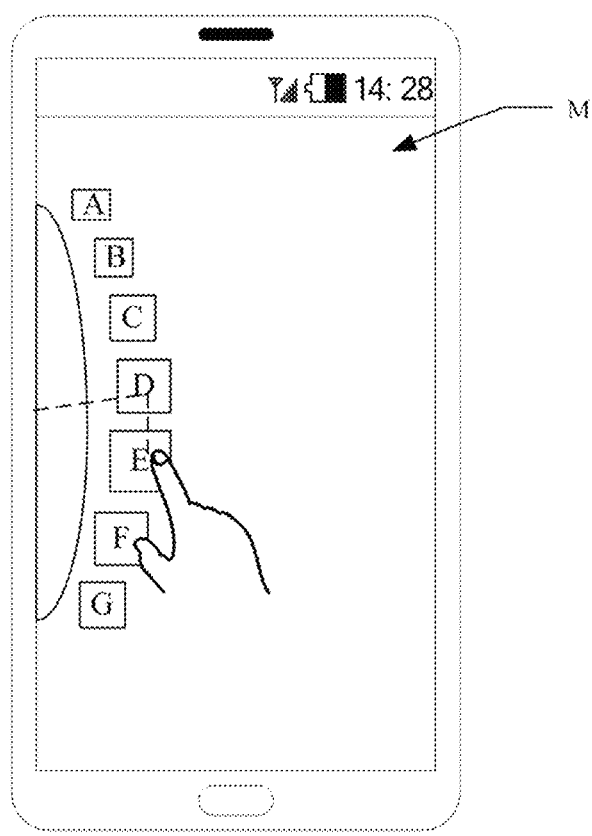
FIG. 3B is a diagram illustrating another interface of an application list according to an exemplary aspect of the present disclosure.

For example, it is assumed that at a previous moment, the sliding position of the target sliding operation on the application list overlaps with the position for displaying the application identification D. Then, at the previous moment, the application identification D is the application identification having the largest size in the application list. It is assumed that at the current moment, the sliding position of the target sliding operation on the application list overlaps with the position for displaying the application identification E. Then, the size of the application identification D may be reduced and the size of the application identification E may be increased, as shown in FIG. 3B, such that the application identification E becomes the application identification having the largest size in the application list. Optionally, as shown FIG. 3B, a size of each application identifications in the application list except for the application identification E may be gradually changed according to a distance from the application identification to the application identification E. The sizes of the application identifications in the application list satisfy: application identification E>application identification D=application identification F>application identification C=application identification G>application identification B>application identification A. Alternatively, the sizes of all of the application identifications in the application list except for the application identification E are the same.

It should be noted that, distinguishingly displaying a certain application identification may also include: distinguishing said application identification from other application identification in colors. It is possible to display said application identification in one color, and display other application identifications in another color. For example, said application identification is displayed in red, and other application identifications are displayed in blue.

Further, during the process of performing the target sliding operation, the application list is displayed on the current display interface of the terminal such that the background color of the application list changes with the change of the sliding position of the target sliding operation on the application list, which enriches the displaying manner of the applications.

Optionally, the color of the application identification in the application list may be the original color of the application identification. When the sliding position of the target sliding operation on the application list overlaps with a position for displaying a certain application identification, the background color of the application list may be adjusted to the color of said application identification. For example, when the sliding position of the target sliding operation on the application list overlaps with the application identification of WeChat, the background color of the application list may be adjusted to green.

Further, when the sliding position of the target sliding operation on the application list overlaps with a position for displaying a certain application identification, basic information of the application indicated by said application identification is displayed. The basic information includes a name of the application indicated by the application identification.

Figure 3C:
FIG. 3C is a diagram illustrating yet another interface of an application list according to an exemplary aspect of the present disclosure.

Optionally, when a certain application identification indicates a weather forecast type application, the basic information may include weather information. For example, as shown in FIG. 3C, the weather forecast type application is Weather, weather information may be displayed in the application list. The weather information may include "weather/sunny air quality excellent 87".

Optionally, when a certain application identification indicates an instant communication type application, the basic information may include a notice of unread messages. For example, the instant communication type application is WeChat, the basic information may include "WeChat/2 pieces of new messages"

Optionally, when a certain application identification indicates an App store type application, the basic information may include a loading progress. For example, the App store type application is Xunlei on mobile phone, the basic information may include "Xunlei on mobile phone/loading progress 20%".

In an aspect of the present disclosure, during the process of performing the target sliding operation, with the change of the sliding position of the target sliding operation on the application list, the terminal may also play different audio. Optionally, when the sliding position of the target sliding operation on the application list overlaps with a position for displaying a certain application identification, an audio corresponding to said application identification which is previously stored is played. Audio corresponding to each application identification in the application list may be previously setup by the user in the terminal. The user may set the audio corresponding to each application identification to the same audio, or may also set the audio corresponding to each application identification to a different audio. Optionally, the audio may be a piece of music selected by the user, or may be a brief audio, such as do, re, mi, fa, sol, la, si. The specific content of the audio is not limited in the aspect of the present disclosure.

In step 2013, when the current display interface of the terminal is not an application interface, the target sliding operation is not responded.

It is to be noted that when the current display interface of the terminal is not an application interface. For example, the current display interface of the terminal is a home interface of the terminal, when it is detected that the user starts to perform a target sliding operation on the terminal, the application list is not displayed on the current display interface. For example, when a rightward sliding operation at the left edge of the display interface of the terminal is received, the terminal performs a rightward flip operation; and when a leftward sliding operation at the right edge of the display interface of the terminal is received, the terminal performs a leftward flip operation.

In step 202, an ending position of the target sliding operation on the application list is acquired.

Optionally, when a time period of touching of the target sliding operation to a certain position on the display interface of the terminal exceeds a preset time period, the terminal may determine the position as the ending position of the target sliding operation; and/or, when a pressure of touching of the target sliding operation to a certain position on the display interface of the terminal exceeds a preset pressure, the terminal may determine the position as the ending position of the target sliding operation; and/or, when the terminal detects no more touch on the display interface of the terminal, the terminal may determine the sliding position of the target sliding operation detected at the last moment as the ending position.

In step 203, an application indicted by an application identification displayed at the ending position is determined as a target application selected by the user.

For example, it is assumed that the application identification displayed at the ending position is the application identification of WeChat. Then, the terminal determines that the target application selected by the user is WeChat.

It should be noted that when no application presents at the ending position of the target sliding operation on the current display interface of the terminal, the terminal may directly withdraw the application list, and remain the display of the original display interface. Alternatively, the terminal may continue displaying the application list on the current display interface, and when it is received a touch operation performed by the user on a position other than the position of the application list on the display interface of the terminal, the terminal withdraws the application list, and remains the display of the original display interface.

In step 204, when it is received a selection operation continuously performed with the target sliding operation at the ending position, a list of function options of a target application is displayed on the display interface.

Optionally, the selection operation may be an extended press operation on an application identification of a target application at the ending position. The extended press operation is an operation with a touching time period exceeding a preset time period. Alternatively, the selection operation may be a pressure touch operation on an application identification of a target application at the ending position. The pressure touch operation is an operation with a touching pressure exceeding a preset pressure.

Figure 3D:
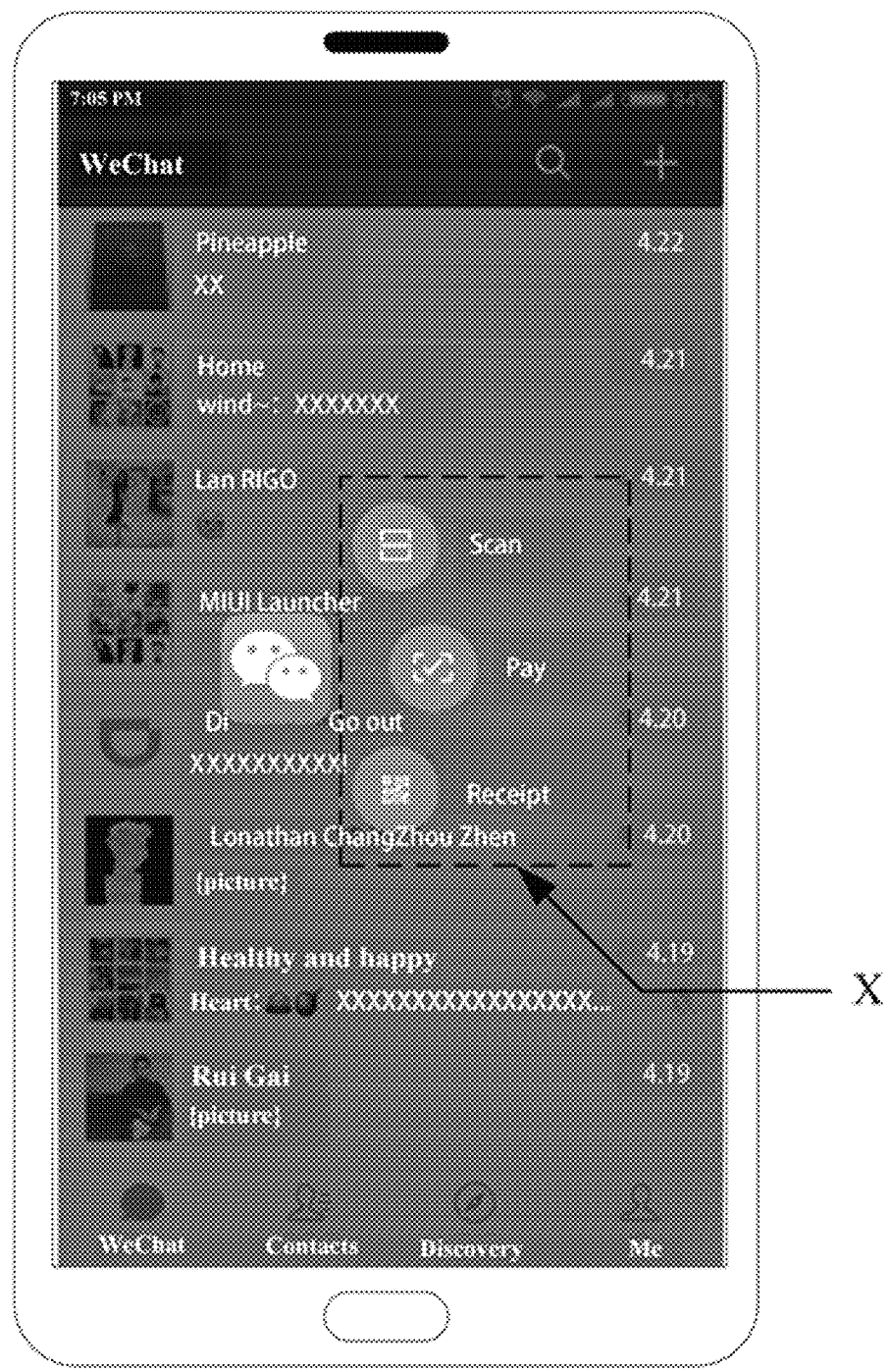
FIG. 3D is a diagram illustrating an interface of a list of function options according to an exemplary aspect of the present disclosure.

For example, as shown in FIG. 3D, it is assumed that the target application is WeChat. When an extended press operation on the application identification of WeChat is received at the ending position of the target sliding operation, a list X of function options of WeChat may be displayed on the display interface. For example, there may be 3 function options in the list X of function options, respectively "scan", "pay", "receipt".

The list X of function options may include all of the function options of the target application, or may include function options of the target application which are used by the user in a preset time period, as detected by the operating system of the terminal, or may be function options of the target application which are used by the user for a number times larger than a preset number of times in the history (i.e. frequently used function options), as detected by the operating system of the terminal, or may be function options of the target application which are previously set up by the user. The setup of the function options in the list of function options is not limited in the aspect of the present disclosure.

In step 205, a touch operation performed by the user on a certain function option in the list of function options is received.

Optionally, the touch operation may be a click operation, a double click operation and an extended press operation, and so on.

In step 206, a function interface corresponding to said function option of the target application is displayed on the current display interface.

For example, it is assumed that the terminal receives a touch operation performed by the user on the "scan" in the list of function options of WeChat as shown in FIG. 3D, and the function interface of "scan" of WeChat is displayed on the current display interface of the terminal. The user may directly enter the function interface to perform scanning. It may simplify the operation steps for the user to use the function of the application, and facilitate the user to quickly use the function of the application.

In step 207, when it is received no selection operation continuously performed with the target sliding operation at the ending position, an initial application interface of the target application is displayed on the current display interface.

For example, it is assumed that the target application is WeChat. When it is received no selection operation on the application identification of WeChat at the ending position of the target sliding operation, the initial application interface of WeChat is displayed on the current display interface of the terminal.

An aspect of the present disclosure provides an application scenario of the method for displaying an application. When a user brows an application interface of a certain E-commerce application on the terminal, a message of an instant communication application is received. If the user wishes to check the message of the instant communication application, the user may switch the application interface of the E-commerce application on the terminal to the application interface of the instant communication application. With the method for displaying an application provided by the aspect of the present disclosure, the user may only perform a target sliding operation on the display interface of the terminal, and end the target sliding operation at an ending position overlapping with the position for displaying the identification (增译"的标识", 请确认) of the instant communication application, so as to switch the application interface of the E-commerce application on the terminal to the application interface of the instant communication application. That is, it may achieve switching of application in one step, and thus improve the user experience.

It is to be noted that in the method for displaying an application provided by the aspect of the present disclosure, the order of the steps may be adjusted appropriately. For example, step 207 may be performed prior to step 204. The number of steps may be increased or decreased depending on situations. All the modifications to the method readily envisaged by those skilled in the art within the technical scope of the present disclosure should fall within the protection scope of the present disclosure, which will not be repeated herein.

Accordingly, in the method for displaying an application provided by the aspect of the present disclosure, when the terminal detects a target sliding operation, the terminal may display an application list on the current display interface. After an ending position of the sliding operation is acquired, an application interface of an application indicated by an application identification displayed at the ending position may be displayed on the current display interface. Thus, it may display an application by one step operation. When the current display interface is an application interface of an application, it may achieve the function of switching an application, and simplify the operation for switching application interfaces of different applications.

Figure 4A:
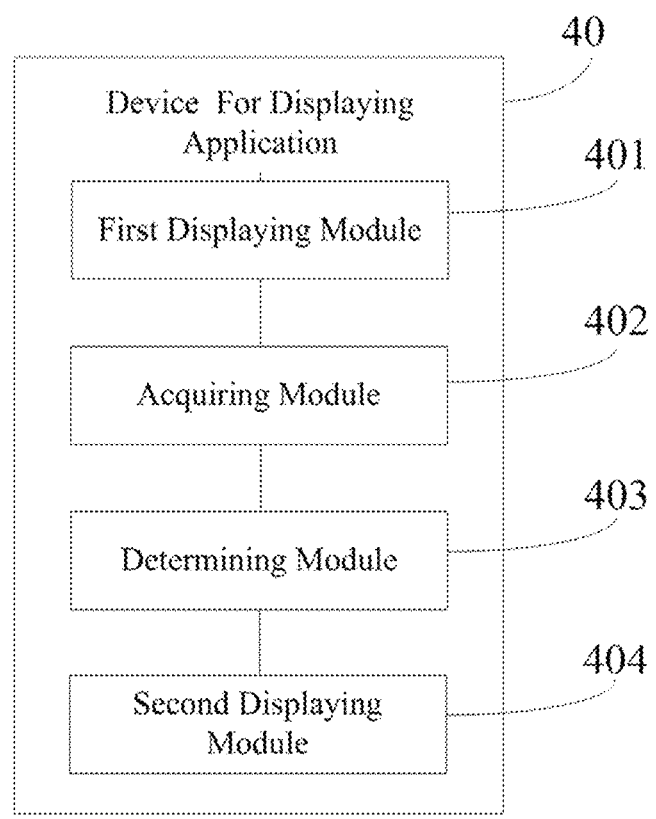
FIG. 4A is a block diagram illustrating a device for displaying an application according to an exemplary aspect.

FIG. 4A is a block diagram illustrating a device 40 for displaying an application according to an exemplary aspect. As shown in FIG. 4A, the device 40 may include the following modules.

A first displaying module 401 is configured to, when detecting that a user starts to perform a target sliding operation on a terminal, display an application list on a current display interface of the terminal, the application list including an application identification of at least one application installed on the terminal.

An acquiring module 402 is configured to acquire an ending position of the target sliding operation on the application list.

A determining module 403 is configured to determine an application indicted by an application identification displayed at the ending position as a target application selected by the user.

A second displaying module 404 is configured to display an application interface of the target application on the current display interface.

Accordingly, in the device for displaying an application provided by the aspect of the present disclosure, when the terminal detects a target sliding operation, the terminal may display an application list on the current display interface via the first displaying module. After an ending position of the sliding operation is acquired via the acquiring module, an application interface of an application indicated by an application identification displayed at the ending position may be displayed on the current display interface via the second displaying module. Thus, it may display an application by one step operation. When the current display interface is an application interface of an application, it may achieve the function of switching an application, and simplify the operation for switching application interfaces of different applications.

Figure 4B:
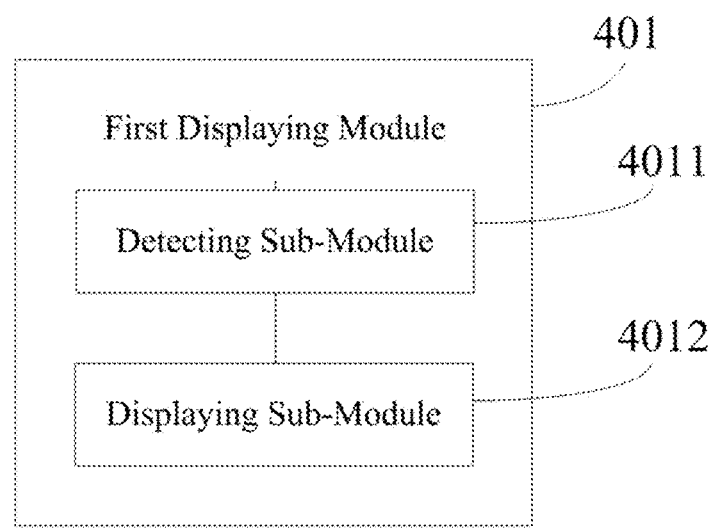
FIG. 4B is a block diagram illustrating a first displaying module according to an exemplary aspect.

Optionally, as shown in FIG. 4B, the first displaying module 401 may include:

a detecting sub-module 4011 configured to, when detecting that a user starts to perform a target sliding operation on a terminal, detect whether the current display interface of the terminal is an application interface; and a displaying sub-module 4012 configured to, when the current display interface of the terminal is an application interface, display the application list on the application interface.

Figure 4C:
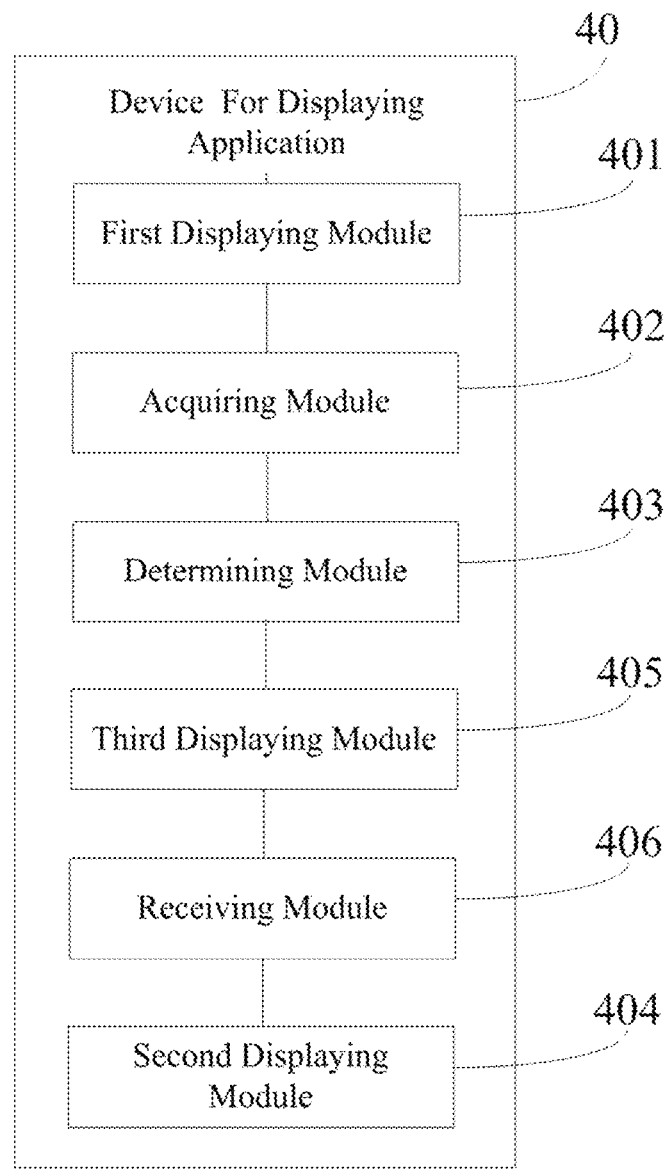
FIG. 4C is a block diagram illustrating another device for displaying an application according to an exemplary aspect.

Optionally, as shown in FIG. 4C, the device 40 may also include:

a third displaying module 405 configured to, after determining the target application selected by the user, when receiving a selection operation continuously performed with the target sliding operation at the ending position, display a list of function options of the target application on the current display interface;

a receiving module 406 configured to receive a touch operation performed by the user on a certain function option in the list of function options.

Correspondingly, the second displaying module may be configured to:

display a function interface corresponding to said function option of the target application on the current display interface.

The selection operation may be an extended press operation on an application identification of a target application at the ending position. The extended press operation is an operation with a touching time period exceeding a preset time period. Alternatively, the selection operation may be a pressure touch operation on an application identification of a target application at the ending position. The pressure touch operation is an operation with a touching pressure exceeding a preset pressure.

Optionally, the target sliding operation may include a rightward sliding operation at a left edge of the display interface of the terminal, or a leftward sliding operation at a right edge of the display interface of the terminal.

Optionally, the first displaying module may be configured to:

display an application list at an edge of the current display interface of the terminal.

Optionally, the first displaying module may be configured to:

during the process of performing the target sliding operation, displaying the application list on the current display interface of the terminal such that a size of the application identification in the application list changes with change of a sliding position of the target sliding operation on the application list.

Further, the first displaying module is further configured to:

when the sliding position of the target sliding operation on the application list overlaps with the position for displaying a certain application identification, distinguishingly display said application identification.

Still further, the first displaying module is further configured to:

reduce sizes of application identifications except said application identification such that said application identification is the application identification having the largest size in the application list; and/or increase the size of said application identification such that said application identification is the application identification having the largest size in the application list; and/or highlight said application identification.

Optionally, the first displaying module is further configured to:

during the process of performing the target sliding operation, display the application list on the current display interface of the terminal such that a background color of the application list changes with change of a sliding position of the target sliding operation on the application list.

Further, the first displaying module may be further configured to:

when the sliding position of the target sliding operation on the application list overlaps with a position for displaying a certain application identification, adjust the background color of the application list to the color of said application identification.

Figure 4D:
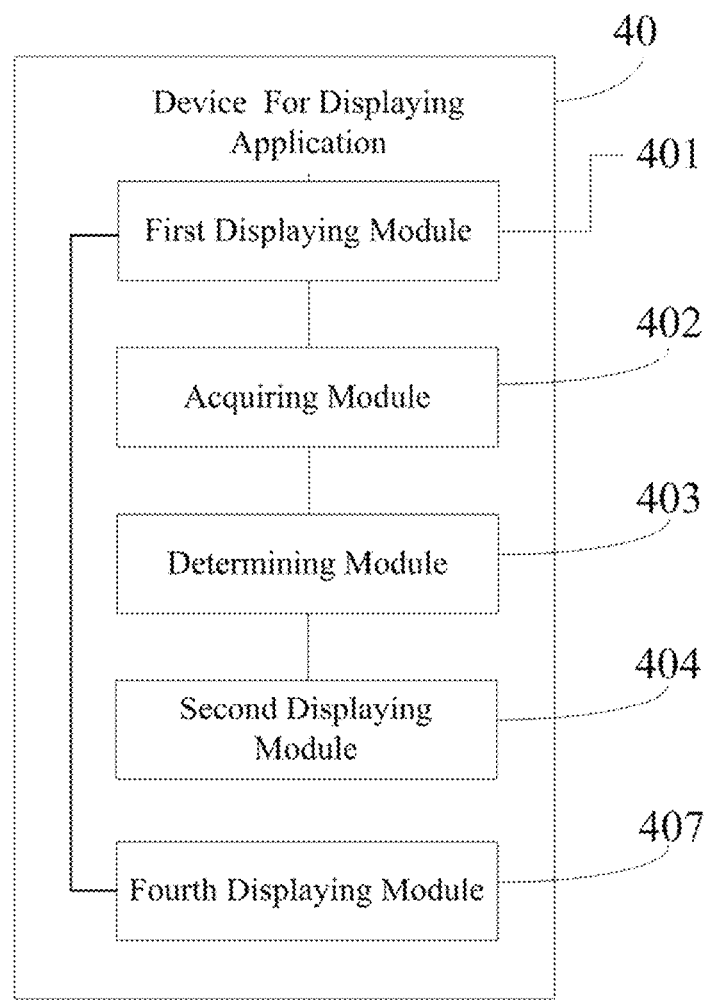
FIG. 4D is a block diagram illustrating yet another device for displaying an application according to an exemplary aspect.

Optionally, as shown in FIG. 4D, the device 40 may also include:

a fourth displaying module 407 configured to, when the sliding position of the target sliding operation on the application list overlaps with the position for displaying a certain application identification, display basic information of the application indicated by said application identification, the basic information including a name of the application indicated by the application identification.

When said application identification indicates a weather forecast type application, the basic information includes weather information.

Alternatively, when said application identification indicates an instant communication type application, the basic information includes a notice of unread messages.

Alternatively, when said application identification indicates an App store type application, the basic information includes a loading progress.

Figure 4E:
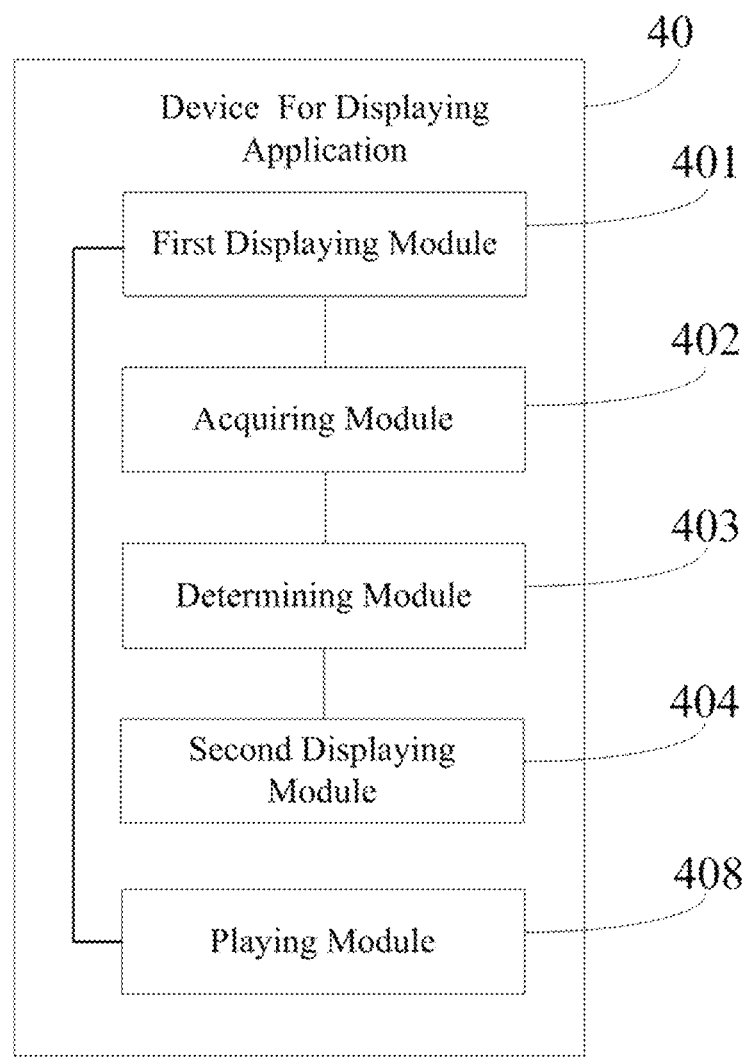
FIG. 4E is a block diagram illustrating still yet another device for displaying an application according to an exemplary aspect.

Optionally, as shown in FIG. 4E, the device 40 may also include:

a playing module 408 configured to, during the process of performing the target sliding operation, with change of a sliding position of the target sliding operation on the application list, play different audio.

Optionally, the playing module may be configured to:

when the sliding position of the target sliding operation on the application list overlaps with a position for displaying a certain application identification, play an audio corresponding to said application identification which is previously stored.

Accordingly, in the device for displaying an application provided by the aspect of the present disclosure, when the terminal detects a target sliding operation, the terminal may display an application list on the current display interface via the first displaying module. After an ending position of the sliding operation is acquired via the acquiring module, an application interface of an application indicated by an application identification displayed at the ending position may be displayed on the current display interface via the second displaying module. Thus, it may display an application by one step operation. When the current display interface is an application interface of an application, it may achieve the function of switching an application, and simplify the operation for switching application interfaces of different applications.

With respect to the devices in the above aspects, the specific manners for performing operations for individual modules therein have been described in detail in the aspects regarding the relevant methods, which will not be elaborated herein.

An aspect of the present disclosure provides a device for displaying an application, including:

a processor; and a memory for storing instructions executable by the processor;

wherein the processor is configured to perform:

when detecting that a user starts to perform a target sliding operation on a terminal, displaying an application list on a current display interface of the terminal, the application list including an application identification of at least one application installed on the terminal;

acquiring an ending position of the target sliding operation on the application list;

determining an application indicted by an application identification displayed at the ending position as a target application selected by the user; and displaying an application interface of the target application on the current display interface.

Figure 5:
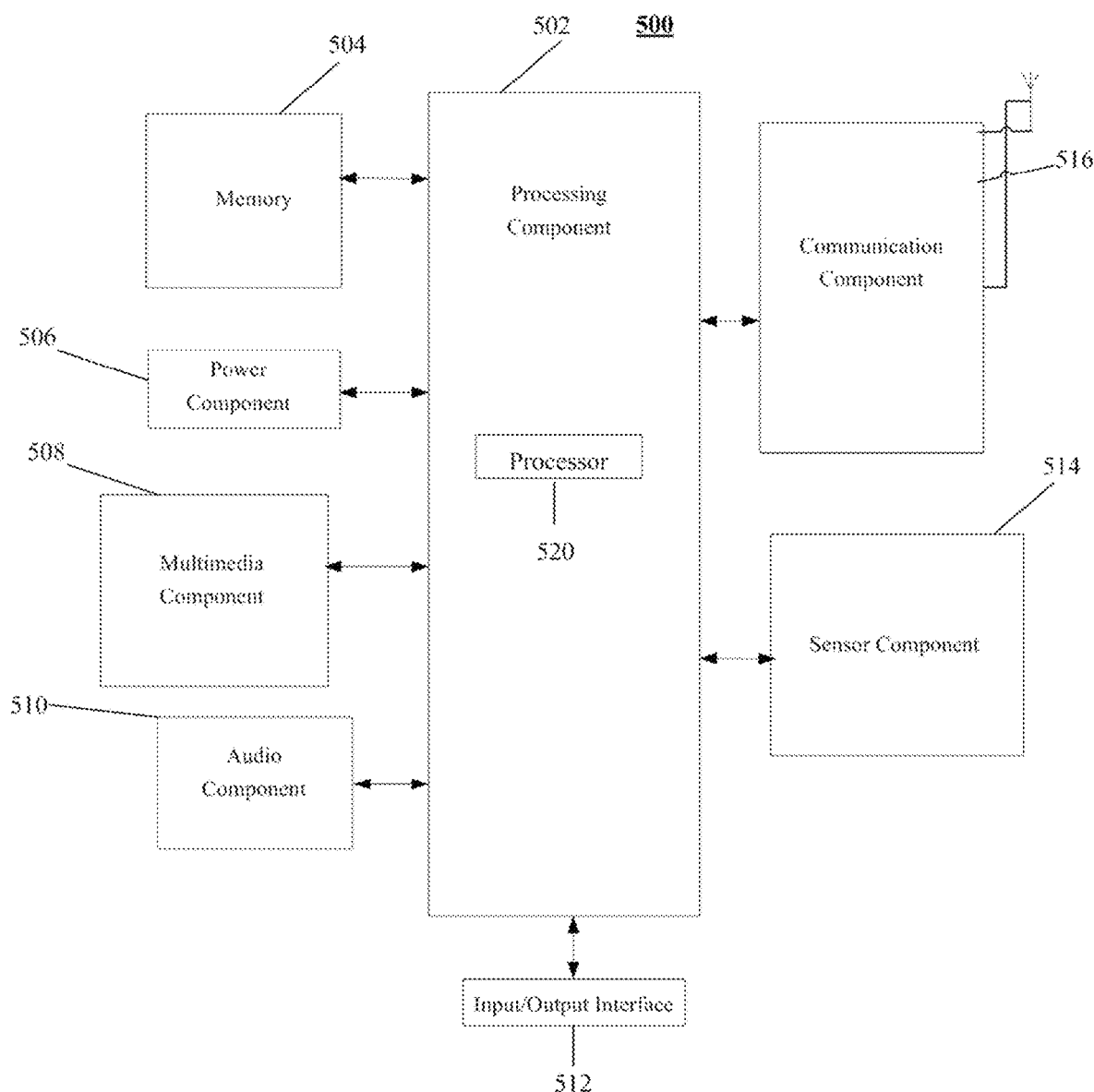
FIG. 5 is a block diagram illustrating a terminal for displaying an application according to an exemplary aspect.

FIG. 5 is a block diagram illustrating a terminal 500 for displaying an application according to an exemplary aspect. For example, the terminal 500 may be a mobile phone, a computer, a digital broadcast terminal, a messaging device, a gaming console, a tablet, a medical device, exercise equipment, a personal digital assistant, and the like.

Referring to FIG. 5, the terminal 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the terminal 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the terminal 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the terminal 500. The power component 506 may include a power management system, one or more power sources, and any other components associated with the generation, management, and distribution of power in the terminal 500.

The multimedia component 508 includes a screen providing an output interface between the terminal 500 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 508 includes a front camera and/or a rear camera. The front camera and the rear camera may receive an external multimedia datum while the terminal 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the terminal 500 is in an operation mode, such as a call mode, a recording mode, and a voice recognition mode. The received audio signal may be further stored in the memory 504 or transmitted via the communication component 516. In some aspects, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the terminal 500. For instance, the sensor component 514 may detect an open/closed status of the terminal 500, relative positioning of components, e.g., the display and the keypad, of the terminal 500, a change in position of the terminal 500 or a component of the terminal 500, a presence or absence of user contact with the terminal 500, an orientation or an acceleration/deceleration of the terminal 500, and a change in temperature of the terminal 500. The sensor component 514 may include a proximity sensor configured to detect the presence of nearby objects without any physical contact. The sensor component 514 may also include a light sensor, such as a CMOS or CCD image sensor, for use in imaging applications. In some aspects, the sensor component 514 may also include an accelerometer sensor, a gyroscope sensor, a magnetic sensor, a pressure sensor, or a temperature sensor.

The communication component 516 is configured to facilitate communication, wired or wirelessly, between the terminal 500 and other devices. The terminal 500 can access a wireless network based on a communication standard, such as WiFi, 2G, or 3G, or a combination thereof. In one exemplary aspect, the communication component 516 receives a broadcast signal or broadcast associated information from an external broadcast management system via a broadcast channel. In one exemplary aspect, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the terminal 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer readable storage medium including instructions, such as included in the memory 504, executable by the processor 520 in the terminal 500, for performing the above-described methods. For example, the non-transitory computer-readable storage medium may be a ROM, a RAM, a CD-ROM, a magnetic tape, a floppy disc, an optical data storage device, and the like.

An aspect of the present disclosure also provides a non-transitory computer readable storage medium, when instructions in the storage medium are executed by the processor component of the terminal 500, enables the terminal 500 to perform the above method for displaying an application. For example, the method may include:

when detecting that a user starts to perform a target sliding operation on a terminal, displaying an application list on a current display interface of the terminal, the application list including an application identification of at least one application installed on the terminal;

acquiring an ending position of the target sliding operation on the application list;

determining an application indicted by an application identification displayed at the ending position as a target application selected by the user; and displaying an application interface of the target application on the current display interface.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and aspects be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for displaying an application, comprising:
   detecting a start of a target sliding operation by a user on a terminal;
   in response to detecting the start of the target sliding operation, detecting whether a current display interface of the terminal is an application interface of an application;
   in response to detecting that the current display interface of the terminal is the application interface, displaying an application list on the application interface of the terminal, the application list including an application identification of at least one application installed on the terminal, and in response to detecting that the current display interface of the terminal is not the application interface, not displaying the application list on the application interface;
   acquiring an end position of the target sliding operation on the application list;
   in response to determining that the end position overlaps with a displaying position of a first application identification of the application list, displaying an application interface of a target application indicated by the first application identification on the current display interface;
   in response to receiving a selection operation continuously performed with the target sliding operation at the end position, displaying a list of function options of the target application on the current display interface, wherein the selection operation continuously performed with the target sliding operation is an extended press operation or a pressure touch operation on the application identification of the target application at the ending position; and
   in response to receiving no selection operation continuously performed with the target sliding operation at the ending position, switching from the current display interface to an initial application interface of the target application.

2. The method according to claim 1, further comprising:
   receiving a touch operation performed by the user on a function option in the list of function options; and
   displaying a function interface corresponding to the function option of the target application on the current display interface.

3. The method according to claim 1, wherein displaying the application list on the current display interface of the terminal comprises:
   during the target sliding operation, displaying the application list on the current display interface of the terminal such that a size of the first application identification in the application list changes with change of a sliding position of the target sliding operation on the application list.

4. The method according to claim 3, further comprising:
   when the sliding position of the target sliding operation on the application list overlaps with a position for displaying the first application identification, distinguishingly displaying the first application identification.

5. The method according to claim 4, wherein distinguishingly displaying the application identification comprises:
   reducing sizes of other application identifications except the first application identification such that the first application identification has a size that is larger than the other application identifications in the application list.

6. The method according to claim 4, wherein distinguishingly displaying the application identification comprises:
   increasing the size of the first application identification such that the first application identification has a size that is larger than the other application identifications in the application list.

7. The method according to claim 4, wherein distinguishingly displaying the application identification comprises:
   highlighting the first application identification.

8. The method according to claim 1, wherein displaying the application list comprises:
   during the target sliding operation, displaying the application list on the current display interface of the terminal such that a background color of the application list changes with change of a sliding position of the target sliding operation on the application list.

9. The method according to claim 1, further comprising:
   when a sliding position of the target sliding operation on the application list overlaps with a position for displaying the first application identification, displaying basic information of the application indicated by the first application identification, the basic information including a name of the application indicated by the first application identification.

10. The method according to claim 1, further comprising:
    during the target sliding operation, with change of a sliding position of the target sliding operation on the application list, playing different audio.

11. A device for displaying an application, comprising:
    a processor; and
    a memory for storing instructions executable by the processor;
    wherein the processor is configured to:
      detect a start of a target sliding operation by a user on a terminal;
      in response to detecting the start of the target sliding operation, detect whether a current display interface of the terminal is an application interface of an application;
      in response to detecting that the current display interface of the terminal is the application interface, display an application list on the application interface of the terminal, the application list including an application identification of at least one application installed on the terminal and in response to detecting that the current display interface of the terminal is not the application interface, not display the application list on the application interface;

acquire an end position of the target sliding operation on the application list;

in response to determining that the end position overlaps with a displaying position of a first application identification of the application list, display an application interface of a target application indicated by the first application identification on the current display interface;

in response to receiving a selection operation continuously performed with the target sliding operation at the end position, display a list of function options of the target application on the current display interface, wherein the selection operation continuously performed with the target sliding operation is an extended press operation or a pressure touch operation on the application identification of the target application at the ending position; and in response to receiving no selection operation continuously performed with the target sliding operation at the ending position, switch from the current display interface to an initial application interface of the target application.

12. The device according to claim 11, wherein the processor is further configured to:

receive a touch operation performed by the user on a function option in the list of function options; and display a function interface corresponding to the function option of the target application on the current display interface.

13. The device according to claim 11, wherein the processor is further configured to:

during the target sliding operation, display the application list on the current display interface of the terminal such that a size of the first application identification in the application list changes with change of a sliding position of the target sliding operation on the application list.

14. The device according to claim 13, wherein the processor is further configured to:

when the sliding position of the target sliding operation on the application list overlaps with a position for displaying the first application identification, distinguishingly displaying the first application identification.

15. The device according to claim 14, wherein distinguishingly displaying said application identification comprises:

reducing sizes of other application identifications except the first application identification such that the first application identification has a size that is larger than the other application identifications in the application list.

16. The device according to claim 14, wherein distinguishingly displaying said application identification comprises:

increasing the size of the first application identification such that the first application identification has a size that is larger than the other application identifications in the application list.

17. The device according to claim 14, wherein distinguishingly displaying said application identification comprises:

highlighting the first application identification.

18. A non-transitory computer-readable medium storing instructions that, when executed by one or more processors of a computing device, cause the computing device to:

detect a start of a target sliding operation by a user on a terminal;

in response to detecting the start of the target sliding operation, detect whether a current display interface of the terminal is an application interface of an application;

in response to detecting that the current display interface of the terminal is the application interface, display an application list on the application interface of the terminal, the application list including an application identification of at least one application installed on the terminal, and in response to detecting that the current display interface of the terminal is not the application interface, not display the application list on the application interface;

acquire an end position of the target sliding operation on the application list;

in response to determining that the end position overlaps with a displaying position of a first application identification of the application list, display an application interface of a target application indicated by the first application identification on the current display interface;

in response to receiving a selection operation continuously performed with the target sliding operation at the end position, display a list of function options of the target application on the current display interface, wherein the selection operation continuously performed with the target sliding operation is an extended press operation or a pressure touch operation on the application identification of the target application at the ending position; and in response to receiving no selection operation continuously performed with the target sliding operation at the ending position, switch from the current display interface to an initial application interface of the target application.

* * * * *